(12) United States Patent
Armstrong et al.

(10) Patent No.: US 8,520,652 B2
(45) Date of Patent: Aug. 27, 2013

(54) ASYNCHRONOUS COEXISTENCE ARBITRATION

(75) Inventors: Dean Armstrong, Cambridge (GB); Alexander Thoukydides, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 418 days.

(21) Appl. No.: 12/171,660

(22) Filed: Jul. 11, 2008

(65) Prior Publication Data
US 2009/0016374 A1 Jan. 15, 2009

(30) Foreign Application Priority Data
Jul. 12, 2007 (GB) .................................. 0713613.8

(51) Int. Cl.
*H04H 20/67* (2008.01)
(52) U.S. Cl.
USPC ........... 370/339; 370/345; 370/348; 370/431; 370/458; 370/459; 370/462
(58) Field of Classification Search
None
See application file for complete search history.

(56) References Cited

U.S. PATENT DOCUMENTS

| 5,557,606 | A | * | 9/1996 | Moon et al. | 370/296 |
|---|---|---|---|---|---|
| 5,563,883 | A | * | 10/1996 | Cheng | 370/449 |
| 5,689,502 | A | * | 11/1997 | Scott | 370/281 |
| 7,433,348 | B1 | * | 10/2008 | Bordui et al. | 370/350 |
| 7,809,329 | B2 | * | 10/2010 | Rofougaran | 455/39 |
| 2004/0028018 | A1 | * | 2/2004 | Cain | 370/338 |
| 2004/0032836 | A1 | * | 2/2004 | Grilli et al. | 370/252 |
| 2004/0204031 | A1 | * | 10/2004 | Kardach et al. | 455/552.1 |
| 2004/0259589 | A1 | * | 12/2004 | Bahl et al. | 455/553.1 |
| 2005/0053084 | A1 | * | 3/2005 | Abrol et al. | 370/412 |
| 2005/0059347 | A1 | * | 3/2005 | Haartsen | 455/41.2 |
| 2006/0003773 | A1 | * | 1/2006 | Miyata et al. | 455/452.2 |

* cited by examiner

*Primary Examiner* — Jason Mattis
*Assistant Examiner* — James P Duffy
(74) *Attorney, Agent, or Firm* — Novak Druce Connolly Bove + Quigg LLP; Vincent M DeLuca

(57) ABSTRACT

A method for interpreting timing information at a communication support entity operable to communicate wirelessly, includes the steps of: at a first time at the communication support entity, receiving an indicator of a predetermined form over a link from another communication support entity; receiving over the link data representing one or more relative times; interpreting each such relative time represented by the received data as indicating the absolute time that is offset after the first time by the respective relative time together optionally with a latency value; and determining in dependence on the received data the manner in which the communication support entity is to communicate wirelessly at that absolute time.

36 Claims, 1 Drawing Sheet

ASYNCHRONOUS COEXISTENCE ARBITRATION

CROSS-REFERENCE TO RELATED APPLICATION AND CLAIM FOR PRIORITY

This application claims priority under 35 U.S.C. §119 from UK application No. 0713613.8, filed 12 Jul. 2007, the contents of which are hereby incorporated by reference in their entirety.

BACKGROUND OF THE INVENTION

This invention relates to the communication of signalling activity information between coexisting communication support entities and, in particular, the interpretation of signalling activity information at a communication support entity.

An increasing number of modern devices are capable of radio communication using multiple communication technologies. For example, many laptops, PDAs and smartphones are capable of communicating via Bluetooth during a period in which they are also communicating via IEEE 802.11. This can lead to interference between the competing radio signals, resulting in a degradation of system performance. Interference can be especially acute when the two transceivers are operating in the same band or channel, as is the case with Bluetooth and IEEE 802.11, which operate in the Industrial, Scientific and Medical (ISM) frequency band.

One way of mitigating the effects of such interference is to arrange for the communication technologies to cooperate with one another with the aim of ensuring that only one communication technology is transmitting on a particular frequency, band or channel at a time. This cooperation is sometimes termed "coexistence arbitration" and may be achieved through the exchange of activity information between collocated transceivers. Based on the exchanged information a transceiver can choose to schedule its signalling activity so as to avoid collisions or temporal overlap with the signals of a collocated communication technology.

Multiple communication technologies can be collocated on a single integrated circuit. For example, an IC could support both 2.4 and 5 GHz IEEE 802.11 technologies. In other, multi-chip configurations, different chips may provide different communication solutions at a device. This is generally the case for devices in which Bluetooth and IEEE 802.11 coexist—one chip handles Bluetooth communications, and another handles the IEEE 802.11 communications.

In existing coexistence schemes, activity information signals may be exchanged between communication technologies, with each signal indicating that communication activity at the source of the signal will commence coincident with the signal itself, or a fixed time after the signal is received. In such schemes, the time at which the activity information signal is sent is tied to the time at which the communication activity is to occur.

There is therefore a need for a mechanism that allows the transfer of accurate future signalling activity information between communication technologies.

SUMMARY OF THE INVENTION

According to a first aspect of the present invention there is provided a method for interpreting timing information at a communication support entity operable to communicate wirelessly, the method comprising the steps of: at a first time at the communication support entity, receiving an indicator of a predetermined form over a link from another communication support entity; receiving over the link data representing one or more relative times; interpreting each such relative time represented by the received data as indicating the absolute time that is offset after the first time by the respective relative time together optionally with a latency value; and determining in dependence on the received data the manner in which the communication support entity is to communicate wirelessly at that absolute time.

Preferably the communication support entity includes a clock and the method comprises determining the first time by means of that clock.

Preferably the method further comprises the step of storing data representing the first time at the communication support entity.

The indicator may be the first symbol in the data representing one or more relative times. The indicator may be a predetermined symbol. Alternatively, the indicator may be a signal in the preamble of the data stream that includes the data representing one or more relative times.

The latency value may be an estimate of the latency of the link. The link is preferably a wired link.

Suitably the result of the determination step is to inhibit the communication support entity from communicating wirelessly at the absolute time.

According to a second aspect of the present invention there is provided a communication support entity for interpreting timing information received over a link, the communication support entity being operable to communicate wirelessly and comprising: a data receiver for receiving over the link from another communication support entity data representing one or more times; and a time interpretation entity configured to: detect an indicator of a predetermined form received at the data receiver over the link at a first time; interpret each relative time represented by data received at the data receiver as indicating the absolute time that is offset after the first time by the respective relative time together optionally with a latency value; and the communication support entity being arranged to determine in dependence on the received data the manner in which it is to communicate wirelessly at that absolute time.

Preferably the data receiver includes the time interpretation entity. Preferably the data receiver is a UART.

According to a third aspect of the present invention there is provided a method for encoding timing information at a communication support entity operable to communicate wirelessly, the method comprising the steps of: generating an indicator of a predetermined form for transmission over a link at a first time; relative to the first time, encoding one or more absolute times as data representing one or more relative times; at the first time at the communication support entity, transmitting the indicator of the predetermined form over the link to another communication support entity; and transmitting over the link the data representing one or more relative times; wherein the communication support entity is scheduled to communicate wirelessly at at least some of the absolute times.

Preferably the communication support entity includes a clock and the method comprises determining the first time by means of the clock.

Preferably the method further comprises the step of storing data representing the first time at the communication support entity.

Preferably the data representing one or more relative times is transmitted over the link as a delimited data stream. Alternatively, the data representing the one or more relative times is transmitted over the link as a series of messages.

Preferably the method further comprises, as additional absolute times become available at the communication support entity, not transmitting a further indicator and performing only the steps of encoding the absolute times and transmitting the encoded data representing one or more relative times.

Preferably the communication support entity wirelessly transmits or receives data at the times indicated by the one or more absolute times.

The data representing one or more relative times may further include data identifying the nature of the wireless communications scheduled to occur at the respective absolute times.

The data representing one or more relative times may further include data identifying the priority of the wireless communications scheduled to occur at the respective absolute times.

The data representing one or more relative times may further include one or more commands for the other communication support entity.

If at least a predetermined length of time has passed since the last indicator was transmitted, the steps of generating and transmitting an indicator of a predetermined form may be repeated.

Preferably the link is a wired link.

According to a fourth aspect of the present invention there is provided a communication support entity for encoding timing information for transmission over a link, the communication support entity being operable to communicate wirelessly and comprising: a time encoding entity configured to generate an indicator of a predetermined form for transmission over the link at a first time to another communication support entity; relative to the first time at the communication support entity, encode one or more absolute times as data representing one or more relative times; and a data transmitter configured to transmit the indicator of a predetermined form over the link at the first time and to transmit over the link the data representing one or more relative times; wherein the communication support entity is scheduled to communicate wirelessly at at least some of the absolute times.

Preferably the data transmitter includes the time encoding entity. Preferably the data transmitter is a UART.

According to a fifth aspect of the present invention there is provided a method for communicating timing information over a link from a first communication support entity to a second communication support entity, the first and second communication support entities each being operable to communicate wirelessly, the method comprising the steps of:

at the first communication support entity: at a first time, transmitting an indicator of a predetermined form over the link to the second communication support entity; relative to the first time, encoding one or more absolute times as data representing one or more relative times; and transmitting over the link to the second communication support entity the data representing one or more relative times; and at the second communication support entity: at a second time, receiving the indicator over the link; receiving over the link data representing one or more relative times; interpreting each such relative time represented by the received data as indicating the absolute time that is offset after the second time by the respective relative time together optionally with a latency value; and determining in dependence on the received data the manner in which the second communication support entity is to communicate wirelessly at that absolute time.

Preferably the first communication support entity includes a first clock and the second communication support entity includes a second clock, and the method comprises determining the first time by means of the first clock and the second time by means of the second clock. Preferably UARTs perform all the steps of the method at the respective communication support entities except the determining step. Alternatively, UARTs perform the steps of transmitting and receiving the data representing one or more relative times and the steps of encoding, interpreting and determining are performed externally to the UARTs at the respective communication support entities. The latency value may be an estimate of the latency of the UARTs.

Suitably, the link is bidirectional and the second communication support entity is further operable to perform the method of the first communication support entity and the first communication support entity is further operable to perform the method of the second communication support entity.

The first communication support entity may be operable to perform wireless signalling at a first set of frequencies and the second communication support entity may be operable to perform wireless signalling at a second set of frequencies. The first and second sets of frequencies may overlap.

The first and second communication support entities may support different wireless communication technologies.

The communication support entities may coexist at a single device.

Preferably the first communication support entity is scheduled to communicate wirelessly at least at some of the absolute times.

Suitably, the result of the determination step is to inhibit the second communication support entity from communicating wirelessly at the absolute time.

One or both of the communication support entities may support IEEE 802.11 communications. One or both of the communication support entities may support Bluetooth communications.

According to a sixth aspect of the present invention there is provided apparatus comprising first and second communication support entities connected by a link, the first and second communication support entity each being operable to communicate wirelessly, and:

the first communication support entity being configured to: transmit an indicator of a predetermined form over the link at a first time to the second communication support entity; relative to the first time, encode one or more absolute times as data representing one or more relative times; and transmit the data representing one or more relative times over the link;

the second communication support entity being configured to: at a second time, receive the indicator over the link; interpret each relative time represented by data received at the second communication support entity as indicating the absolute time that is offset after the second time by the respective relative time together optionally with a latency value; and determine in dependence on the received data the manner in which the second communication support entity is to communicate wirelessly at that absolute time.

According to a seventh aspect of the present invention there is provided a use, in a communication support entity connected to a link, subsequent to an indicator of a predetermined form having been received over the link at a first time, of data representing one or more relative times received over the link as one or more absolute times offset after the first time by the respective relative times.

BRIEF DESCRIPTION OF THE DRAWINGS

The present invention will now be described by way of example with reference to the accompanying drawings, in which.

DETAILED DESCRIPTION OF THE INVENTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
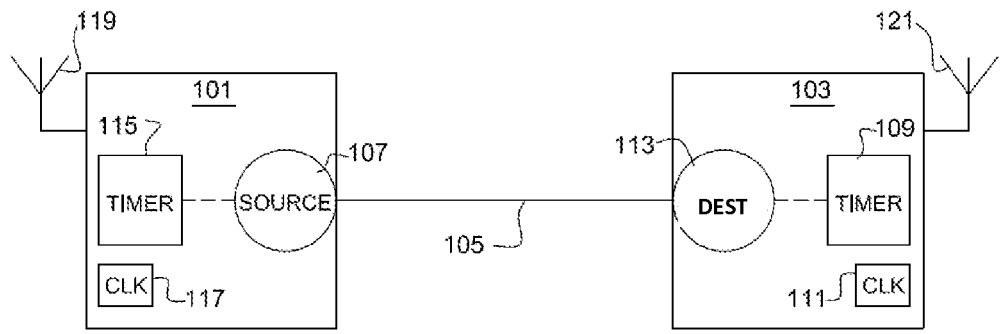
FIG. 1 is a schematic diagram of two communication support entities connected by a link.

FIG. 1 shows two communication support entities 101 and 103 connected by a link 105 in accordance with the present invention. Each communication support entity has its own local time base which can be provided by clock or timer 117, 111, or alternatively each entity can receive timing signals from system timer(s) or external clock(s) accessible to the entities. A source 107 or destination 113 unit terminates the link at each entity. The link may be bi-directional or uni-directional and there may be one or more links between a pair of communication support entities—for example, there may be two uni-directional links supporting the flow of timing information in opposite directions.

The present invention relates to the exchange of timing information between communication support entities. An embodiment of the invention will now be described with reference to FIG. 1 in which communication support entity 101 sends timing information to communication support entity 103.

When entity 101 has timing information to send to entity 103, absolute time references in the time base local to entity 101 are passed to source unit 107. If a time-zero indicator has not yet been sent by the source unit to destination unit 113, the source unit sends a time-zero indicator. The source unit then derives a relative time from each absolute time and sends a representation of the relative time to the destination unit. The relative times are determined relative to the time at which the time-zero indicator was sent to the destination unit. The time represented by the time base local to entity 101 at the moment when the source unit transmits the time-zero indicator will be referred to as the "source reference time".

The time represented by the time base local to entity 103 at the moment when the destination unit receives the time-zero indicator will be referred to as the "destination reference time". The destination unit interprets the subsequently received representations of the relative times as absolute times relative to that reference time. In other words, the destination unit adds the absolute destination reference time to the relative times received from entity 101 so as to determine the absolute times in the time base local to entity 103 represented by those relative times. Using this mechanism, the timers of entities 101 and 103 do not have to be synchronized in order to exchange meaningful timing information and entity 101 can indicate to entity 103 an arbitrary time at which signalling activity is to occur.

The time-zero indicator may be one or more predetermined symbols, known to both the source and destination units, transmitted over the link. Preferably the indicator is the first symbol in a chain of timing information. In other words, the choice of symbol is unimportant and the destination unit takes the indicator to be the first symbol it receives. Alternatively, the time-zero indicator may be indicated by a signal or tone within the timing information, or by a predetermined signal in the preamble of the first data word.

Further time-zero indicators may be sent subsequently to the initial transmission of a time-zero indicator—for example, periodically within a transmission sequence of timing information (and perhaps at some predetermined frequency). Following the transmission of a further time-zero indicator, source unit 107 updates its reference time and derives subsequently-transmitted representations of relative times relative to that new reference time. Upon receiving a further time-zero indicator, the destination unit updates its reference time and so interprets subsequently received representations of relative times as absolute times in the time base local to entity 103.

This allows entity 103 to receive accurate timing information over an extended period of time, particularly in situations where there is some drift between the local timer of entity 101 and the local timer of entity 103 (i.e. the two timers run at slightly different rates).

These mechanisms may be extended to the situation in which one master (source) entity sends its activity information to more than one slave (destination) entity—for instance, so as to ensure that the communications of the slave entities do not overlap with those of the master entity.

The source and destination reference times may be stored at entity 101 and entity 103, respectively. The reference times may be stored at the source and destination units themselves. The source reference time may be only approximately the time at which the last time-zero indicator was sent. For example, it may be the time at which the source unit forms the time-zero indicator or it may be an estimate of the time at which a time-zero indicator is sent. The source reference time is preferably as close as possible to the time at which the time-zero indicator is actually sent over the link. In the case of an estimated source reference time, the estimate may be based upon a known or typical delay between the time at which the source unit forms the time-zero indicator and the time at which it is sent.

Similarly, the destination reference time may be only approximately the time at which the last time-zero indicator was received. For example, it may be the time at which the destination unit detects the time-zero indicator or it may be an estimate of the time at which the time-zero indicator was received. The destination reference time is preferably as close as possible to the time at which the time-zero indicator is actually received over the link. In the case of an estimated destination reference time, the estimate may be based upon a known or typical delay between the time at which the destination unit receives the time-zero indicator and the time at which the destination unit detects the time-zero indicator.

In a preferred embodiment, link 105 is a serial link and source unit 107 and destination unit 113 are source and destination UARTs (Universal Asynchronous Receiver/Transmitters), respectively. Preferably the source unit 107 and destination unit 113 are UARTs configured to perform the method of the present invention: in other words, the source UART is operable to derive the representations of relative times from the absolute time references passed to it and the destination UART is operable to interpret those representations as absolute times in the time base local to the destination entity. Source and destination UARTs in accordance with one embodiment of the present invention therefore support extensions to the behaviour of conventional UARTS.

In alternative embodiments, the source and destination units are conventional UARTs and the processing required to form the representations of relative times at the source entity and interpret the relative times as absolute times in the time base of the destination entity is performed by suitable processors at or available to those respective entities. In such embodiments, the source reference time is formed at the source entity and is the time at which the time-zero indicator is passed to the source UART for transmission over the link, and the destination reference time is formed at the destination entity and is the time at which the time-zero indicator is passed from the destination UART to the destination entity for processing. Since there is some latency inherent in the source and destination UARTs the destination reference time will indicate a time some time after the source reference time (ideally the two times would reference the same time instant). As described above, the source and destination reference times may be estimated by adjusting one or both of the reference times to compensate for the delay introduced by one or both of the source and destination UARTs.

FIG. 1 also includes antennas 119 and 121 for communication support entities 101 and 103, respectively. These are not essential to the present invention but in the figure help to illustrate the coexistence of the communication technologies. The timing information sent over link 105 describes the timing of radio (or any other band) transmissions supported by communication support entity 101 and transmitted by means of antenna 119. As a result of receiving this information, communication support entity 103 can schedule its radio transmissions from antenna 121 so as to minimize interference and collisions between the competing signals. Alternatively, entities 101 and 103 may share a common antenna 213, as illustrated in FIG. 2.

The present invention allows a communication support entity to be able to accurately determine when communication activity is scheduled to occur at a coexisting communication support entity so as to avoid temporal overlap between competing communication signals.

Figure 2:
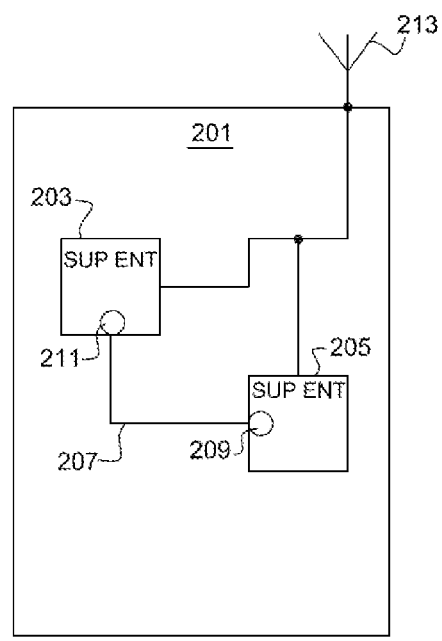
FIG. 2 is a schematic diagram of a mobile device supporting two communication technologies sharing a common antenna.

FIG. 2 illustrates a particular use of the present invention in a mobile device 201 supporting two coexisting communication technologies. For example, communication support entity 203 may support Bluetooth communications and communication support entity 205 may support IEEE 802.11b/g (Wi-Fi) communications. Because both of these communication technologies occupy the 2.4 GHz ISM band, interference and signal collisions can occur between the signals of the two technologies. It is desirable to adopt a coexistence scheme that allows a transmitter or receiver of one of those protocols to operate in the presence of interference from signals of the other protocol. In FIG. 2, the communication support entities are shown sharing a single antenna 213, although in practice each communication support entity may have its own antenna.

The embodiments described herein are merely exemplary and it will be understood by the skilled person that the communication support entities may support communication protocols other than Wi-Fi and Bluetooth.

In an embodiment of the present invention described above, one of the communication support entities is chosen to be the source (master) entity and the other the destination (slave) entity. For example, due to the alignment of Bluetooth transmissions to predetermined time slots, it is generally preferred that a Bluetooth communication support entity is the master to a Wi-Fi communication support entity. The timings of typically bursty Wi-Fi communications can be influenced and varied during operation in response to the periodic Bluetooth communications. Thus, in the embodiment shown in FIG. 2, communication support entity 203, which supports Bluetooth communications, is the master entity and passes signalling activity information over link 207 to Wi-Fi support entity 205.

Typically, Wi-Fi and Bluetooth communications are handled by dedicated integrated circuits having their own internal clocks. The present invention allows an integrated circuit supporting one communication protocol to pass accurate signalling activity information to another integrated circuit supporting the other communication protocol without the need to synchronize those clocks. Clock synchronization typically requires a dedicated interface between the integrated circuits over which synchronizing pulses can be sent. This has several disadvantages, including: (i) the synchronizing pulses are a source of electromagnetic interference and can become coupled to adjacent circuitry; (ii) increased complexity of the circuits as a result of the interface; (iii) increased power requirements, particularly at high clock rates.

In contrast, in the case of a serial link, the present invention allows an integrated circuit to use a low-pin count interface to communicate accurate timing information. In the preferred embodiment this is achieved by means of extensions to the behaviour of conventional source and destination UARTs. The link may be a single wire connecting two entities. The asynchronous interface further allows commands or additional information to be exchanged over the link without compromising the accuracy of the timing information. This stems from the fact that in the present invention the time instant being communicated over the link need not have any fixed relationship to the instant at which it is communicated.

In other embodiments of the present invention, both communication support entities may support Bluetooth or both may support Wi-Fi. The mechanisms described are generally applicable to a plurality of coexisting communication support entities and are not dependent on the particular communication protocols in use.

The timing information conveyed to the destination entity may include times at which the master communication support entity is scheduled to transmit and/or times at which it is scheduled to receive. If known to the master communication support entity, it could further indicate to the destination entity the times at which other, distinct communication entities are scheduled to transmit. For example, a Wi-Fi communication support entity may be aware of the transmission schedule of a nearby Wi-Fi entity with which it is communicating.

Figure 3:
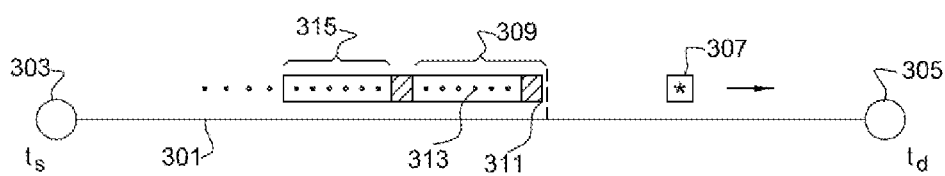
FIG. 3 illustrates the transmission of timing information from a source unit to a destination unit.

FIG. 3 illustrates in more detail the transmission of timing information from one entity to another. Source unit 303 and destination unit 305 are shown, which terminate link 301. As described above in relation to FIG. 1, the processing of the timing information may occur at the source and destination units, or externally to the units at some processor at or available to the respective entities.

In a preferred embodiment, at time $t_s$ (the source reference time) a time-zero indicator 307 is sent by source unit 303 to destination unit 305. The destination unit receives the time-zero indicator at time $t_d$ (the destination reference time). Preferably time $t_d-t_s$ is as short as possible so that relative times generated at the source unit relative to $t_s$ are translated into absolute times at the destination unit essentially also relative to $t_s$.

In the embodiments in which the processing of the timing information occurs externally to the source and destination units, times $t_d$ and $t_s$ may be estimates of the true send and receive times.

The time-zero indicator may be a special symbol, word, bit sequence or a predetermined tone or other signal identifiable at the destination unit or entity. Time-zero indicator 307 may be contained within a preamble or inter-packet delay in the timing information. The time-zero indicator may alternatively be the start of the timing information 311, or a first symbol or word 313 in a stream of timing information.

Subsequently to the time-zero indicator being sent, one or more messages 309, 315 comprising the representations of the relative times generated at source unit 303 are sent to the destination unit. Preferably the representations are sent as a stream of timing data or as a series of messages. The relative time representations may be delimited by start/stop characters, gaps of a predetermined length, or by any other method of delimiting or encoding data items known in the art. Preferably the time representations are sent over the link by the source unit as and when the timing information becomes available (and the source entity is therefore configured to pass an absolute time reference to the source unit as soon as a communication event is scheduled).

The data sent over the link may further include information indicating what type of communication event will be occurring at one or more of the represented times, the signal strength at the source entity and/or the priority of the data being communicated. For example, each representation of a relative time may be accompanied by a code or descriptor which indicates to the destination entity what type of communication event will be occurring at the specified time. This type information may simply identify whether the communication support entity is receiving or transmitting, or it may be more detailed and indicate which channel or band the communication will be taking place on. In a particularly useful embodiment the type information may specify whether a time is a start time or a stop time—in this case the specified times delimit the bounds of communication activity by the master communication support entity. Alternatively the scheduled period of a communication event may be indicated along with the specified times.

The data sent over the link may include one or more commands issued by the master to the slave communication support entity as a code or descriptor in the data stream or in a message. These commands may include: (i) halt all communication activity (on a particular band or channel); (ii) do not use a particular band or channel; (iii) free to use a particular band or channel; (iv) an indication as to whether the specified times are times at which the destination entity should or should not transmit.

The mechanisms described herein for passing timing data from one communication support entity to another may be extended to bidirectional links. In this case, there is no master and slave relationship between the entities but in accordance with the present invention both can indicate timing information to the other entity. This exchange of signalling activity information allows the entities to detect potential collisions and reschedule their communication activity accordingly.

In a simple case, when two entities are both scheduled to transmit at the same time, one may always take precedence. The use of commands over the link as described above, further permits arbitration between communication support entities as to which entity is to transmit at a particular time. For example, the priority of the data each entity has to transmit may be taken into account, or the time since each of the entities last transmitted data. Further factors which may be taken into account are well known in the art of coexistence arbitration from protocols such as Packet Traffic Arbitration (PTA) as described by IEEE 802.15.2.

By means of the present invention, a source communication support entity may indicate to a destination communication support entity the times at which wireless signalling by any other communication support entity is scheduled to take place. The source entity may receive this information by means of a coexistence arbitration scheme with a third communication support entity, the source entity may receive signalling activity information in accordance with the present invention from a third entity, or it may receive such information by any other means (for example, by detecting periodic wireless signalling and extrapolating its occurrence at future times).

The present invention may be applied to the exchange of timing information between communication support entities over a network or bus. For example, the link may be an link over which data packets may be sent from one entity to another, or it may be a bus over which data may be transferred. There may be intermediate units along the link such as switches, routers, or bus controllers. Packet-switched links may introduce jitter in the time at which the timing indicator is received at the destination entity. It is preferable that the level of jitter is less than the maximum tolerance in the timing information necessary to meet a required accuracy in the reconstructed times. This may be achieved by enforcing a certain quality of service for the link.

The nature of packet-switched networks allows communication support entities to send timing information to multiple destination entities almost simultaneously, or to target specific entities with which the source entity may not have a direct connection. In line with the embodiments described above, the timing indicator may be a symbol in a data packet (preferably the first symbol) or a symbol in the header of the packet. Preferably any network link between two such communication support entities is a dedicated connection-based link. However, in low latency network environments the link can be a simple packet-switched connection and, in applications which do not require a high timing accuracy, at least part of the link may be routed over a public network. It is further preferable that the destination reference time at the destination network entity is adjusted to allow for the transit time of the packet—in other words the destination reference time is an estimate of the source reference time.

Preferably the link is a dedicated wired link between communication support entities, such as a serial wire link between two chips each supporting a wireless communication technology. However, in other embodiments the link may be a wireless link.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for interpreting timing information sent by a first communication support entity to a coexisting second communication support entity, each of said first and second communication support entities operable to communicate wirelessly, the method comprising the steps of:

receiving at said second communication support entity a time-zero indicator of a predetermined form over a wired link from said first communication support entity;

determining an absolute time at which said second communication support entity receives said time-zero indicator as a destination reference time;
receiving at said second communication support entity data representing a first relative time from said first communication support entity indicating a wireless communication;
converting said received first relative time to a first absolute time at said second communication support entity by adding said first relative time to said destination reference time;
receiving at said second communication support entity data representing a second relative time from said first communication support entity indicating a wireless communication;
converting said received second relative time to a second absolute time at said second communication support entity by adding said second relative time to said destination reference time; and
determining the manner in which the second communication support entity is to communicate wirelessly with respect to said first and second absolute times converted from said first and second relative times so as to minimize interference between wireless communications of the second communication support entity and the coexisting first communication support entity.

2. A method as claimed in claim 1, wherein the second communication support entity includes a clock and the method comprises determining the destination reference time by means of that clock.

3. A method as claimed in claim 1, further comprising the step of storing data representing the destination reference time at the second communication support entity.

4. A method as claimed in claim 1, wherein the time-zero indicator is a first symbol in data from said first communication support entity representing one or more relative times.

5. A method as claimed in claim 1, wherein the time-zero indicator is a predetermined symbol.

6. A method as claimed in claim 1, wherein the time-zero indicator is a signal in a preamble of a data stream that includes data representing one or more relative times.

7. A method as claimed in claim 1, wherein the step of converting includes taking into account a latency value representative of an estimate of a latency of said link.

8. A method as claimed in claim 1, wherein the result of the determination step is to inhibit the second communication support entity from communicating wirelessly at the absolute time converted from a respective relative time.

9. A communication support entity for interpreting timing information received over a link from a coexisting communication support entity, the communication support entity being operable to communicate wirelessly and comprising:
a data receiver for receiving data over a wired link from said coexisting communication support entity data also operable to communicate wirelessly; and
a time interpretation entity configured to:
detect a time-zero indicator of a predetermined form received at the data receiver over the link;
determine an absolute time at which said time-zero indicator is detected as a destination reference time;
convert a first relative time indicating a wireless communication represented by data received at the data receiver to a first absolute time at said communication support entity by adding the first relative time to said destination reference time;
convert a second relative time indicating a wireless communication represented by data received at the data receiver to a second absolute time at said communication support entity by adding the second relative time to said destination reference time; wherein
the communication support entity being arranged to determine the manner in which it is to communicate wirelessly with respect to said first and second absolute times converted from said first and second relative times so as to minimize interference between wireless communications of the communication support entity and the coexisting communication support entity.

10. A communication support entity as claimed in claim 9, wherein the data receiver includes the time interpretation entity.

11. A communication support entity as claimed in claim 9, wherein the data receiver is a UART.

12. A method for encoding timing information at a first communication support entity operable to communicate wirelessly and coexisting with a second communication support entity also operable to communicate wirelessly, the method comprising the steps of:
generating a time-zero indicator of a predetermined form for transmission over a wired link to said second coexisting communication support entity;
determining an absolute time at which said time-zero indicator is transmitted to said second coexisting communication support entity as a source reference time;
encoding a first absolute time indicating a wireless communication as data representing a first relative time with respect to said source reference time;
transmitting to said second communication support entity over the link the data representing said first relative time;
encoding a second absolute time indicating a wireless communication as data representing a second relative time with respect to said source reference time; and
transmitting to said second communication support entity over the link the data representing said second relative time; wherein
the first communication support entity wirelessly transmits or receives data at the absolute times; and
data transmitted over said wired link further includes data identifying the nature of wireless communications scheduled to occur at respective absolute times.

13. A method as claimed in claim 12, wherein the first communication support entity includes a clock and the method comprises determining the source reference time by means of the clock.

14. A method as claimed in claim 12, further comprising the step of storing data representing the source reference time at the first communication support entity.

15. A method as claimed in claim 12, wherein data representing relative times is transmitted over the link as a delimited data stream.

16. A method as claimed in claim 12, wherein data representing relative times is transmitted over the link as a series of messages.

17. A method as claimed in claim 12, wherein data transmitted over said wired link further includes data identifying priority of wireless communications scheduled to occur at respective absolute times.

18. A method as claimed in claim 12, wherein data transmitted over said wired link further includes one or more commands for the second communication support entity.

19. A method as claimed in claim 12, further comprising, if at least a predetermined length of time has passed since the last time-zero indicator was transmitted, repeating the steps of generating and transmitting a time-zero indicator of a predetermined form.

20. A communication support entity for encoding timing information for transmission over a link to a coexisting communication support entity, the communication support entity being operable to communicate wirelessly and comprising:
  a time encoding entity configured to:
    generate a time-zero indicator of a predetermined form for transmission over a wired link to said coexisting communication support entity also operable to communicate wirelessly;
    determine an absolute time at which said time-zero indicator is transmitted to said coexisting communication support entity as a source reference time;
    encode a first absolute time indicating a wireless communication as a first relative time with respect to said source reference time;
    encode a second absolute time indicating a wireless communication as a second relative time with respect to said source reference time; and
  a data transmitter configured to transmit the time-zero indicator over the link and to subsequently transmit the encoded first and second absolute times over the link to the coexisting communication support entity.

21. A communication support entity as claimed in claim 20, wherein the data transmitter includes the time encoding entity.

22. A communication support entity as claimed in claim 20, wherein the data transmitter is a UART.

23. A method of communicating timing information over a wired link from a first communication support entity to a coexisting second communication support entity, the first and second communication support entities each being operable to communicate wirelessly, the method comprising the steps of:
  at the first communication support entity:
    transmitting a time-zero indicator of a predetermined form over the link to the coexisting second communication support entity;
    determining an absolute time at which said time-zero indicator was transmitted to the coexisting second communication support entity as a source reference time;
    encoding a first absolute time indicating a wireless communication as a first relative time with respect to said source reference time;
    transmitting over the link to the second communication support entity the data representing said first relative time;
    encoding a second absolute time indicating a wireless communication as a second relative time with respect to said source reference time; and
    transmitting over the link to the second communication support entity the data representing said second relative time;
  at the second communication support entity:
    receiving the time-zero indicator over the link from the first communication support entity;
    determining an absolute time at which said time-zero indicator was received from said first communication support entity as a destination reference time;
    receiving over the link said data representing said first relative time;
    converting said first relative time to a first absolute time by adding said first relative time to said destination reference time;
    receiving over the link said data representing said second relative time;
    converting said second relative time to a second absolute time by adding said second relative time to said destination reference time; and
    determining the manner in which the second communication support entity is to communicate wirelessly with respect to said absolute time converted from said first and second relative times so as to minimize interference between wireless communications of the first and second communication support entities.

24. A method as claimed in claim 23, wherein the first communication support entity includes a first clock and the second communication support entity includes a second clock, and the method comprises determining the source reference time by means of the first clock and the destination reference time by means of the second clock.

25. A method as claimed in claim 23, wherein UARTs perform all the steps of the method at the respective communication support entities except the determining step.

26. A method as claimed in claim 23, wherein UARTs perform steps of transmitting and receiving data representing relative times and the steps of encoding and determining are performed externally to the UARTs at the respective communication support entities.

27. A method as claimed in claim 26, wherein the step of converting includes taking into account a latency value representative of an estimate of a latency of the UARTs.

28. A method as claimed in claim 23, wherein the link is bi-directional and the second communication support entity is further operable to perform the method of the first communication support entity and the first communication support entity is further operable to perform the method of the second communication support entity.

29. A method as claimed in claim 23, wherein the first communication support entity is operable to perform wireless signalling at a first set of frequencies and the second communication support entity is operable to perform wireless signalling at a second set of frequencies.

30. A method as claimed in claim 29, wherein the first and second sets of frequencies overlap.

31. A method as claimed in claim 29, wherein the communication support entities coexist at a single device.

32. A method as claimed in claim 29, wherein the result of the second determining step is to inhibit the second communication support entity from communicating wirelessly at the absolute time converted from said first relative time.

33. A method as claimed in claim 29, wherein one or both of the communication support entities supports IEEE 802.11 communications.

34. A method as claimed in claim 29, wherein one or both of the communication support entities supports Bluetooth communications.

35. A method as claimed in claim 23, wherein the first and second communication support entities support different wireless communication technologies.

36. Apparatus comprising coexisting first and second communication support entities connected by a wired link, the first and second communication support entity each being operable to communicate wirelessly, and:
  the first communication support entity being configured to:
    transmit a time-zero indicator of a predetermined form over the link to the second communication support entity;
    determine an absolute time at which said time-zero indicator was transmitted to said second communication support entity as a source reference time;

encode a first absolute time indicating a wireless communication as a first relative time with respect to said source reference time;

transmit the data representing said first relative time over the link to said second communication support entity;

encode a second absolute time indicating a wireless communication as a second relative time with respect to said source reference time; and transmit the data representing said second relative time over the link to said second communication support entity;

the second communication support entity being configured to:

receive the time-zero indicator over the link from said first communication support entity;

determine an absolute time at which said time-zero indicator was received from said first communication support entity as a destination reference time;

convert the first relative time received at the second communication support entity to an absolute time by adding the first relative time to said destination reference time;

convert the second relative time received at the second communication support entity to an absolute time by adding said second relative time to said destination reference time; and determine the manner in which the second communication support entity is to communicate wirelessly with respect to said absolute times converted from said first and second relative times so as to minimize interference between wireless communications of the first and second communication support entities.

* * * * *